Dec. 30, 1969  W. A. ALSTEDT  3,486,653
EXTRACTOR MECHANISM FOR A WAREHOUSE SYSTEM
Filed Nov. 16, 1966  3 Sheets-Sheet 1

INVENTOR.
WILLIAM A. ALSTEDT
BY
Baldwin, Doran & Egan
ATTORNEYS

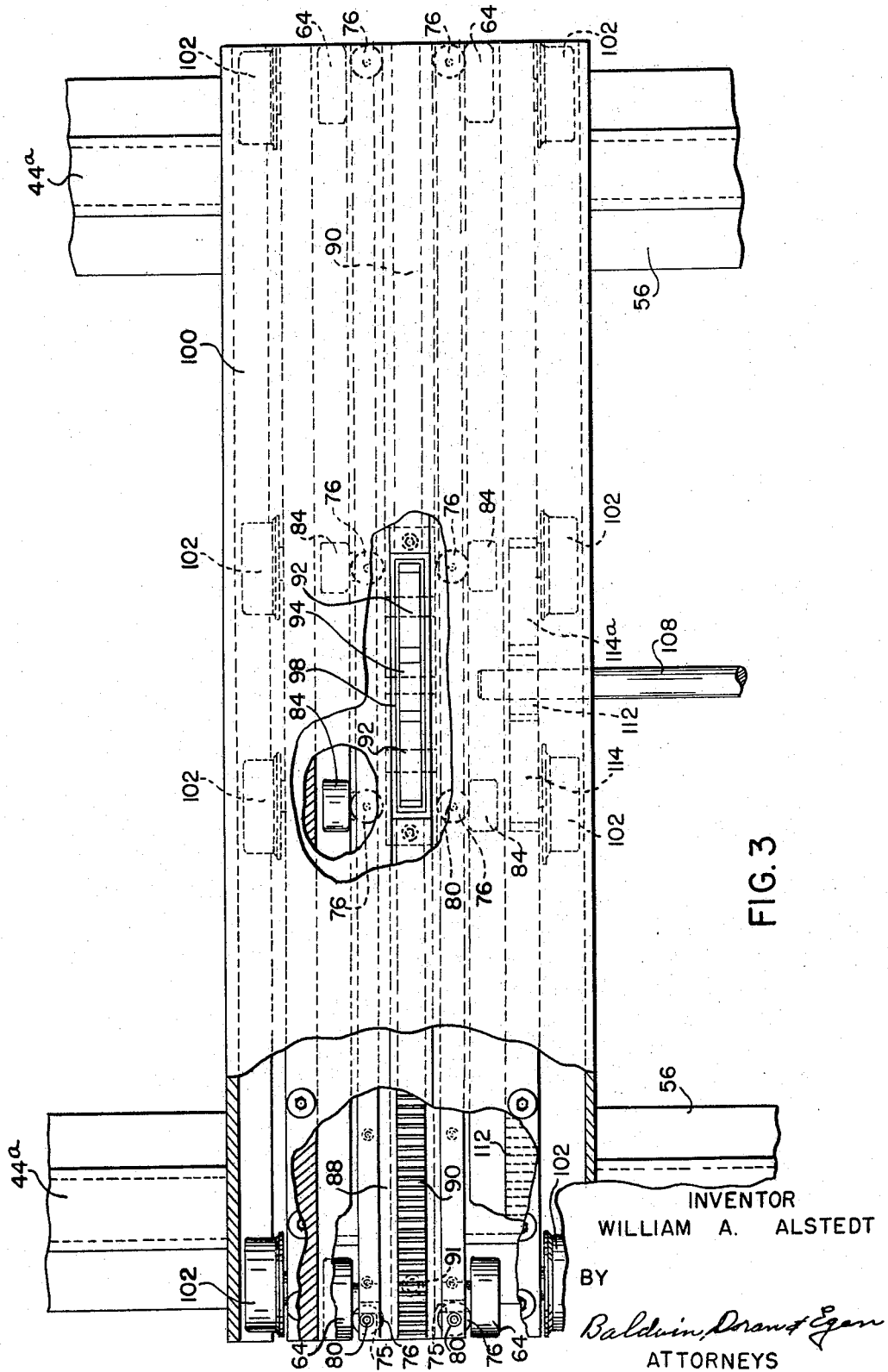

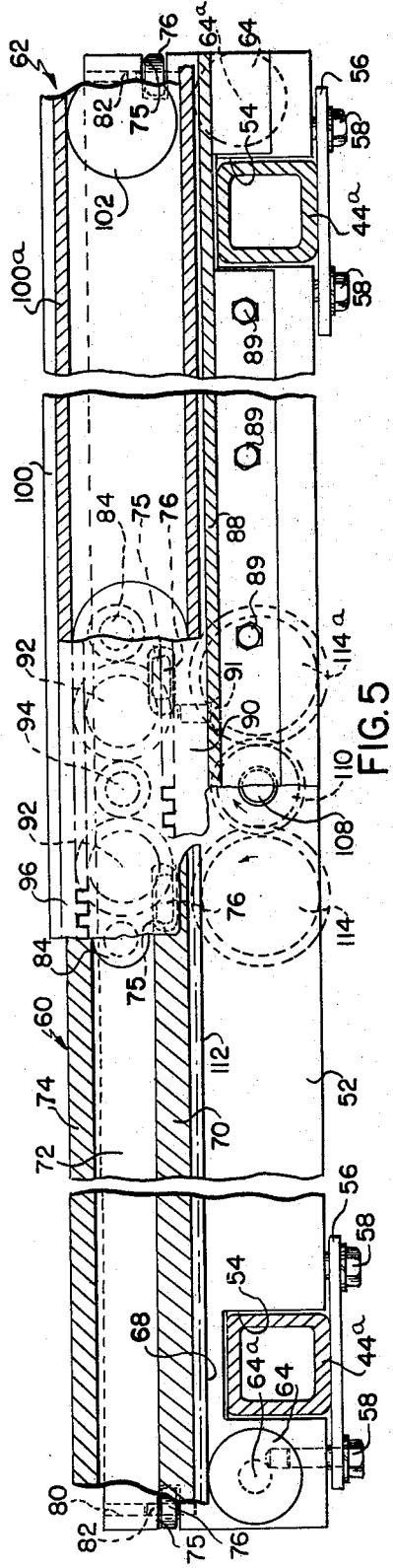

United States Patent Office 3,486,653
Patented Dec. 30, 1969

3,486,653
EXTRACTOR MECHANISM FOR A WAREHOUSE SYSTEM
William A. Alstedt, Cleveland, Ohio, assignor to The Triax Company, Cleveland, Ohio, a corporation of Ohio
Filed Nov. 16, 1966, Ser. No. 594,708
Int. Cl. B66f 9/06; E04h 6/00
U.S. Cl. 214—730                    8 Claims

ABSTRACT OF THE DISCLOSURE

A warehousing system comprising a mobile load carrier and having an extensible extractor, with the extractor comprising first and second relatively movable load supporting members mounted on a generally horizontal support portion of the load carrier, whereby the extractor may be extended laterally outwardly from the support portion and with means supporting the load carrying members on the support portion. The support means comprises outer main load bearing rollers on the support portion disposed generally beneath the members and engaging the first load carrying member on the underside thereof and reaction means coacting between the first load carrying member and the support portion, including reaction rollers disposed inwardly of the main rollers and being disposed at a higher level than the engagement of the main rollers with the first load carrying member, and with the reaction rollers being of a smaller size as compared to the size of the main rollers, thereby providing for a reduced thickness or height of extractor mechanism.

---

This invention relates in general to warehousing systems including a movable load carrier for transporting loads to and from a storage frame and relates more particularly to a novel laterally extendible cantilever type extractor mechanism mounted on a vertically movable elevator of the load carrier of the system, for transferring a load between the elevator and load support means in the storage frame of the system.

A warehousing system of the general type to which the present invention may be applied but by no means the only such system is disclosed in assignee's U.S. Patent 3,139,994 issued July 7, 1964 in the name of Anthony R. Chasar, and entitled "Mechanical Load Handling, Transfer and Storage Equipment." Such patented warehousing system comprises a storage frame having vertically and horizontally arranged load support means opening at vertical work faces disposed on either side of an intermediate aisle or travel zone. An automatically controlled mechanized load carrier is movable along the aisle or travel zone and such load carrier comprises a horizontally movable conveyor frame which travels alongside the storage frame and provides vertical track means for an elevator capable of delivering loads to different levels in the storage frame. The elevator in turn carries a laterally extendible cantilever-type extractor for inserting loads onto the load support means of the storage frame and for retrieving loads therefrom.

In load transferring extractor constructions heretofore utilized, the extractor has usually comprised relatively movable outer and inner frames mounted in telescopic relation on the elevator support for providing for the extensibility of the extractor mechanism, and with means being provided for driving the outer frame outwardly ahead of the inner frame during extension of the extractor. Load rollers have been provided for supporting the relatively movable frames during relative movement thereof with respect to the elevator support and heretofore such load rollers have conventionally been mounted on the elevator support in substantial upwardly projecting relation with respect to the support, and have engaged the extractor mechanism in supporting relation at locations above the lower extremity of the extractor mechanism. Such prior art arrangements have generally made access to the load rollers difficult and have resulted in extractor mechanisms of substantial thickness.

The present invention provides an extractor mechanism wherein the load rollers for supporting the extractor mechanism are mounted beneath the extractor and engage in supporting relation the underside of the latter, thus permitting the use of larger rollers and providing for reducing the thickness or depth of the extractor frames. Also the load rollers are more readily accessible than in previous arrangements and thus are readily available for replacement or repair thereof in a more convenient manner than heretofore possible.

Accordingly, it is an object of the present invention to provide a novel extractor mechanism for use in a warehousing system.

Another object of the invention is to provide a novel extractor mechanism for use in a warehousing system and wherein the extractor mechanism comprises relatively movable frames including an upper frame and a lower frame with load rollers for supporting the lower frame for relative movement with respect to a support and to the upper frame, and wherein such load rollers are mounted beneath the lower frame.

A further object of the invention is to provide a cantilever type extractor mechanism having telescoping inner and outer frames and wherein roller means are provided for relative movement between the inner and outer frames and wherein such roller means are beneath the extractor mechanism whereby the extractor mechanism may be of a lesser thickness.

Other objects and advantages of the invention will be apparent from the following description taken in conjunction with the accompanying drawings, wherein:

FIGURE 3 is a fragmentary enlarged top plan view of one of the extractor sections of the invention with parts of the extractor section being cut away to show internal construction;

FIGURE 4 is an enlarged fragmentary end elevational view of the extractor illustrating both of the extractor sections, only one of which is shown in detail, it being understood that the other section is generally identical in structure to the detailed showing;

FIGURE 5 is a broken sectional view taken generally along the plane of line 5—5 of FIGURE 4 looking in the direction of the arrows, with parts of the structure being broken away to illustrate internal mechanism.

Figure 1:
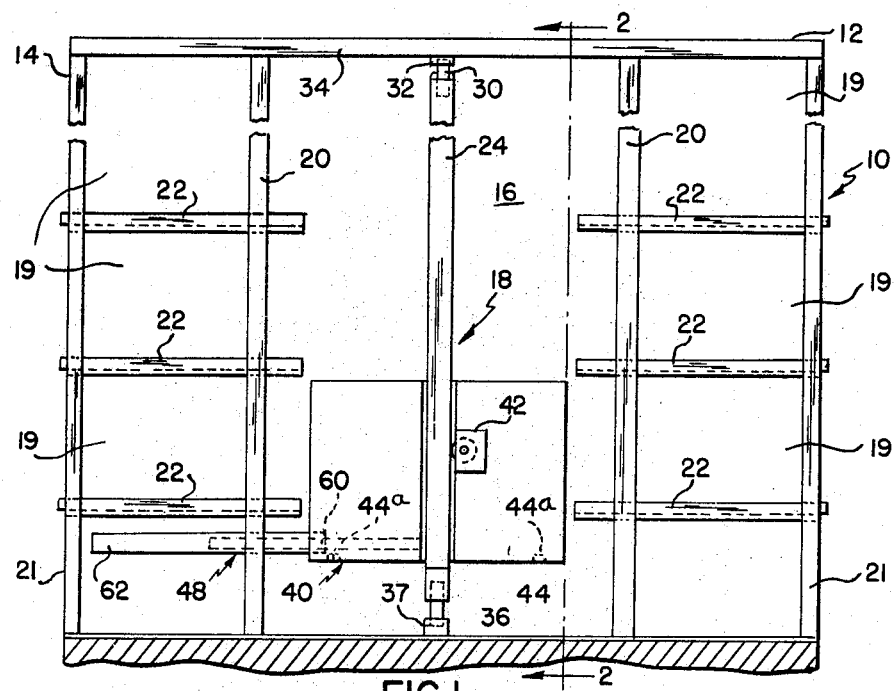
FIGURE 1 is an end view of a mechanized warehousing system incorporating the invention.
Figure 2:
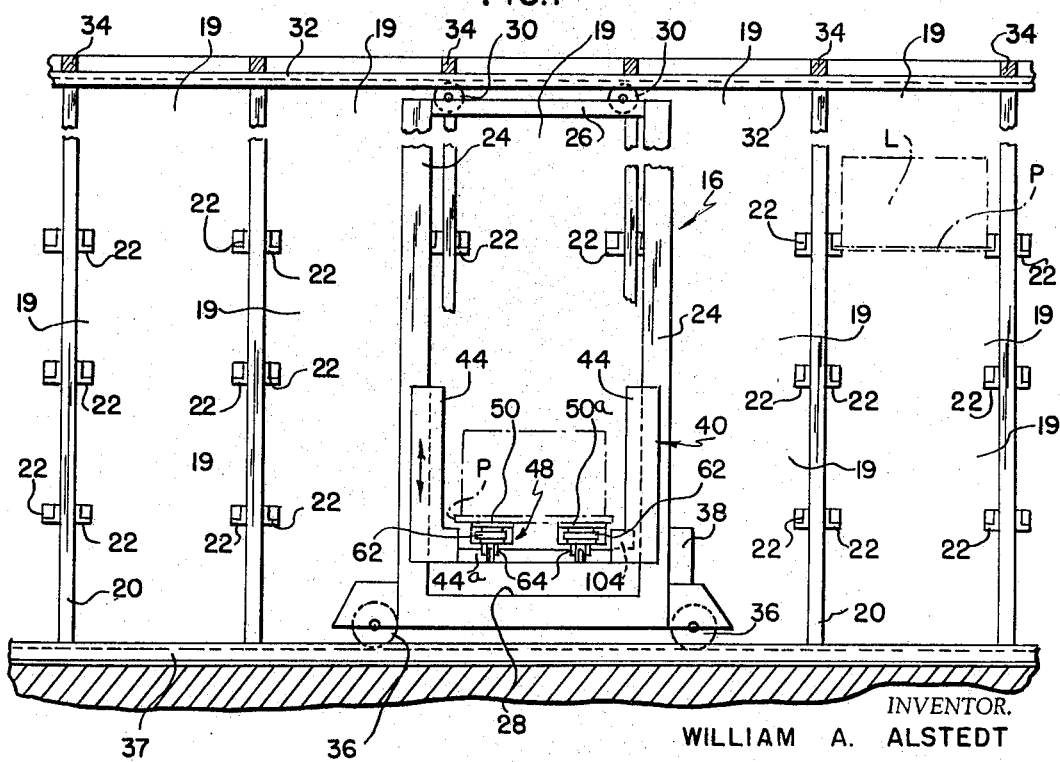
FIGURE 2 is a sectional view taken along line 2—2 of FIGURE 1.

Referring now again to the drawings, and in particular to FIGURES 1 and 2 thereof, the warehousing system illustrated may comprise a storage frame 10 having a plurality of storage bay sections 12 and 14 arranged along either side of an aisle 16, so as to permit a load carrier indicated generally at 18 to be moved along the aisle or travel zone and to insert and/or withdraw a load or article L (FIGURE 2) from the storage bins 19 in the storage sections 12 and 14.

As shown, each storage section may be constructed of a plurality of vertically extending posts 20, 21 spaced apart by a plurality of generally horizontally extending load supporting members 22 which at their aisle or inner ends extend inwardly toward the aisle, and provide a plurality of the aforementioned storage bins, the latter having open load receiving ends defining a generally vertical plane. The loads stored in the storage bay sections are mounted in the individual bins by bridging loads across the flanges of the support members 22. The loads are preferably carried upon pallets P (FIGURE 2) for storing purposes. The instant arrangement of storage frame may be generally similar to that disclosed in the co-pending U.S. patent application, Ser. No. 484,845, filed Sept. 3, 1965, now U.S. Patent No. 3,371,804, in the name of Anthony R. Chasar and entitled Automatic Warehousing System, and reference may be had thereto for a more detailed description of a suitable storage arrangement.

The load carrier 18 may comprise horizontally movable conveyor structure including a pair of vertical masts 24 connected across the top by an end member 26 and across the bottom by base structure 28. The masts 24 are preferably disposed along the center line of the aisle 16 and are spaced apart in the direction of the aisle. The upper end member 26 may be provided with wheels or rollers 30 for rolling engagement with an overhead track or guide 32, carried by the transverse members 34 connecting storage bay sections 12 and 14. Similarly, the base structure 28 may be provided with wheels or rollers 36 for rolling engagement with a base rail or track 37. At least one of the wheels 36 is preferably power driven for driving the load carrier horizontally along the aisle. Such driving means may be of any suitable type such as for instance, an electric motor and gear reduction means indicated generally by reference number 38.

Rails 32 and 37 preferably extend outwardly of the aisle at the front end thereof, to enable the load carrier to be located completely in front of the storage bay sections 12 and 14, at a pickup and discharge station (not shown) from which position the load carrier is adapted to start its movement into the aisle or travel zone, to deposit or pickup loads in the storage frame sections. Such pickup and discharge stations may be located on both sides or on only one side of the load carrier, and at any suitable height relative to the storage frame. Reference may be had to the aforementioned U.S. patent application 484,845, for a disclosure of a suitable pickup and discharge station.

The load carrier 18 may also comprise a vertically movable elevator 40 which is adapted for movement along the vertical masts 24 of the conveyor means to the full height of the storage frame. Suitable power means such as an electric motor 42 may be carried by the conveyor mechanism with such motor being operatively coupled to the elevator 40 in a known manner, for actuating the elevator in its vertical movement. The elevator 40 in the embodiment illustrated comprises generally vertically extending end wall sections 44 and transversely extending cross members 44a secured to wall sections 44 and tying the latter together.

The elevator 40 includes a load supporting platform or extractor mechanism 48, with which the present invention is particularly concerned. The extractor is adapted to provide an extensible mechanism with such mechanism being extendible in either of the opposed directions transverse to the direction of movement of the load carrier in its travel zone, so as to locate the extractor within either of the storage frame sections 12 or 14, effective to place the extensible mechanism in position to deposit a load into or remove a load from a selected one of the storage bins.

The extractor constructed illustrated is of a "twin fork" arrangement comprising spaced extractor load support sections 50, 50a, but it will be understood that only a single section of adequate width may be provided. Since both of such extractor sections are generally identical in construction, only one will be described in detail. Each of the extractor sections 50, 50a, comprises in the embodiment illustrated, a pair of spaced support webs or struts 52 bridging the spaced cross members 44a of the elevator base frame. In this connection, the strut members 52 may be provided with recesses or cutout portions 54 therein (FIGURE 5) adjacent the lateral ends thereof, through which extend the associated cross member 44a of the elevator base frame. Holding plate 56 may be provided beneath each cross member 44a in attached relation thereto, with struts 52 being held in position by fastening means 58 extending from beneath the associated plate 56 upwardly into the associated strut 52. In this connection, it will be seen from FIGURE 5 that the bottom extremities of the cross members 44a are disposed slightly below the bottom extremity of the associated struts, and thus the holding plates and fastener means 58 hold or pull the strut members into gripped and abutting relationship with respect to the associated cross members 44a.

As can be best seen from FIGURES 4 and 5, the struts 52 extend well above the cross members 44a of the base frame, and support thereon the inner frame 60 and the outer frame 62 of the respective extractor section 50 or 50a. The inner frame 60 is disposed in generally telescoped interfitting relationship with respect to the outer frame 62 and is adapted to be driven laterally of the elevator in either direction transverse to the travel zone or aisle 16, with the outer frame 62 being adapted to be driven ahead of the inner frame in the manner generally illustrated in FIGURE 1, and as will be hereinafter discussed in greater detail.

Main load rollers 64 are rotatably mounted as at 64a on the outer side surface of each strut member 52 generally adjacent the end extremities thereof, and these load rollers support the nested extractor frames 60 and 62 for lateral movement in relation to the struts 52 and the base of the elevator. As can be best seen in FIGURES 4 and 5, the axes of the load rollers 64 are disposed below the top extremity of the elevator cross members 44a with such load rollers 64 projecting just slightly above the cross members to engage in rolling relationship with the undersides 68 (FIGURE 4) of the inner extractor frame 60. As can be best seen in FIGURE 4, inner frame 60 is out of generally channel shaped configuration in end elevation and is of fabricated construction, including fastener means 69 holding roller engaging portions 70 and side portions 72 of the extractor frame 60 to the upper portion 74 thereof.

Strut members 52 preferably are also provided with elongated recesses 75 (FIGURE 5) therein, in which are rotatably mounted in generally horizontal relation guide rollers 76 for engaging the inner vertical surfaces 78 (FIGURE 4) of portions 70 of the inner extractor frame, for guiding the movement of the inner frame with respect to the stationary strut members 52. In this connection, it will be seen that the struts may be provided with vertically extending slots 80 communicating with recesses 75 therein, through which axial pins 82 for mounting the rollers 76 may be inserted.

Also rotatably mounted on the outer side of each strut 52 adjacent the central supper portion of the struts are a pair of reaction rollers 84 which ride in rolling engagement in the recesses 85 defined by the channel configuration of the inner extractor frame 60. The reaction rollers 84 are disposed in generally vertical alignment with the vertical plane of the load rollers 64 (FIGURE 4) but are disposed close to the central portion of the extractor so as to support the inner frame 60 when it is extended laterally of the elevator base. The aforementioned disassembled fabricated construction (e.g. fasteners 69) of the inner frame provides for ready assembly of the extractor and ready insertion of the reaction rollers 84 into the U-shaped track guideway means 85 formed by the extractor frame 60.

An inverted generally U-shaped (in transverse cross section) support member 88 (FIGURES 4 and 5) may be attached as by means of bolts 89 to the inner sides of the struts 52, with such support member mounting an elongated centrally disposed (with respect to the respective extractor section) rack 90 thereon. Rack 90 preferably extends for the full length of the associated extractor section (FIGURE 3) and may be detachably attached to the support 88 by means of threaded fastener means 91. As can be best seen in FIGURE 4, the teeth of the rack 90 extend upwardly and are disposed in meshing relationship with gears 92 rotatably mounted on frame 60. Gears 92 are spaced from one another lengthwise of frame 60 but are disposed in meshing relationship with an intermediate toothed gear 94 mounted on inner frame 60 intermediate gears 92. Gear 94 is of a size that it is not in meshing relation with rack 90.

Gears 92 in turn are meshed with a rack member 96 which is attached as by means of fasteners 96a to the underside of the outer extractor frame 62, and are operable during rotation thereof to drive the outer frame 62 laterally of the elevator base ahead of the inner frame 60 during the depositing of a load in the storage frame sections 12 or 14 by the extractor mechanism. As can be best seen in FIGURE 3, the gears 92 and 94 are rotatably mounted in a recess in the central portion 98 of the inner frame 60.

The outer frame 62 may include a generally flat top load supporting plate 100 with depending channel-shaped (in transverse cross section) track sections 100a secured to the underside thereof. Inner frame 60 may have idler rollers or wheels 102 rotatably mounted thereon, and which are received in the track sections 100a of the outer frame, for supporting the outer frame during its movement with respect to the inner frame 60 and with respect to the elevator base 44a. As can be best seen in FIGURE 3, there may be four of such rollers 102 on each side of the inner frame, to give good support in a direction lengthwise of the extractor section.

The power means for moving the extractor may comprise a motor 104, such as an electric motor mounted in one of the end wall sections 44 of the elevator, and coupled in any suitable manner to a countershaft 108 (FIGS. 4 and 5) which extends in the general direction of extension of the travel zone 16 and which in the embodiment illustrated is disposed substantially centrally of the extractor. Countershaft 108 may be rotatably mounted in suitable bearing means 109 attached to cross members 44a, and mounted on the countershaft 108 may be drive pinion gears 110, 110a (FIG. 4). It will be seen that there is provided one drive pinion for each of the extractor sections 50, 50a. Mounted in secured relation to the underside of the inner frame 60 of each extractor section, there may be a toothed rack 112, and disposed in meshing relationship with rack 112, are spaced spur gears 114, 114a (FIGS. 3 and 5) rotatably mounted on the elevator base. Each pair of spur gears 114, 114a are disposed in meshing relationship with the associated of the aforementioned drive pinion 110 or 110a on the shaft 108, and upon rotation of the latter, the spur gears 114, 114a are rotated which drive the inner frame 60 laterally with respect to the elevator. Movement of the inner frame laterally with respect to the elevator causes the outer frame to move laterally in the same direction as the inner frame, but ahead of the inner frame, it being understood that the outer frame 62 is caused to move due to rolling rotational movement of the idler gears 92 on the inner frame along the stationary rack 90 mounted on the bridging struts 52 and along the rack 96 mounted on the underside of outer frame 62. The gear ratios are preferably so arranged that the outer frame 62 will travel approximately twice the distance of travel of the inner frame 60.

It will be seen that due to the mounting of the main load rollers 64, completely below the inner frame 60, the thickness or depth of the extractor sections 50 and 50a can be maintained at a minimum, while providing for ready accessibility of the main load rollers for ease of replacement.

Moreover, larger main load rollers can be utilized for greater wearability and load capacity, and the inner reaction rollers 84 are also generally readily accessible by disassembly of the fabricated inner frame 60. The reaction rollers 84 are exposed to approximately half the load applied to the main load rollers 64, and thus can be smaller, aiding in the reduced thickness of the extractor sections 50, 50a.

The extractor sections 50, 50a may be constructed so as to have upwardly turned surface portions on one or both of the inner and outer frames 60, 62, so as to cause one or both of the frames 60, 62 to tilt upwardly as they project out laterally of the elevator base, for aiding in preventing downward sag of the extractor mechanism under load. Reference may be had to the copending U.S. patent application Ser. No. 462,532, filed June 19, 1965, now U.S. Patent No. 3,283,924, in the name of Anthony R. Chasar for a complete disclosure of such non-sag construction.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:
1. In a warehousing system, a mobile load carrier including a generally horizontal portion adapted for supporting an extractor thereon, a load transferring extractor mounted on said support portion, said extractor comprising generally elongated relatively movable load supporting members disposed in nested relation, giving lengthwise extensibility to said extractor whereby the latter may be extended generally laterally outwardly from said support portion, means carried by a first one of said members movably supporting a second one of said members thereon for generally lengthwise movement of said second member with respect to said first member, means for driving said first and second members in a lengthwise direction outwardly from said support portion and driving said second member a greater distance than said first member, means mounted on said support portion and movably supporting said members on said support portion, the last mentioned supporting means including transversely spaced outer main load bearing rollers mounted on said support portion for rotation about generally horizontal axes and disposed generally beneath said members and engaging said first member on the underside thereof, and transversely spaced reaction rollers mounted on said support portion inwardly in a lengthwise direction from said outer main first member having lengthwise extending transversely spaced guideway means thereon, said reaction rollers engaging said first member on said guideway means in supporting relation and at a higher level than the engagement of said main rollers with said first member, said reaction rollers being of a smaller size as compared to the size of said main rollers.

2. A system in accordance with claim 1 wherein said first member comprises a central section and laterally oriented generally channel-shaped sections in end elevation, secured to and depending from said central section, said channel-shaped sections facing one another and defining elongated slots providing said guideway means receiving said reaction rollers therein, each of said slots being of a just slightly greater height than the diameter of a respective reaction roller for ready receipt of the latter therein, the underside of each of said channel-shaped sections providing an elongated generally horizontally oriented engaging surface for a respective one of said main rollers.

3. A system in accordance with claim 1 wherein said main and reaction rollers are mounted on said support portion in generally vertical co-planar relation for rotation about generally horizontal axes with the level of the axes of rotation of said reaction rollers being at a higher level than the level of the axes of rotation of said main rollers, and other rollers mounted on said support portion at a level intermediate the levels of said main and reaction rollers for rotation about generally vertical axes, said other rollers being adapted to engage said first member and guide the lengthwise movement thereof with respect to said support portion.

4. A system in accordance with claim 1 wherein said load carrier includes a vertically movable elevator for moving loads to different storage levels in the system, said elevator providing said support portion and including spaced end wall portions disposed in planes extending generally perpendicular to the plane of said support portion, said support portion comprising generally horizontal cross members extending between said end wall portions and being connected to the latter, said main rollers being so mounted on said support portion that the upper extremity of each of the last mentioned rollers extends just slightly above the upper extremities of said cross members, thus positioning said first member closely adjacent the upper extremities of said cross members.

5. A system in accordance with claim 1 wherein said load carrier includes a vertically movable elevator for moving loads to different storage levels in the system, said elevator providing said support portion and including spaced end walls disposed in planes extending generally perpendicular to the plane of said support portion, said support portion comprising generally horizontal cross members extending between said end walls adjacent the outer extremities of said support portion and being connected to said end walls, a plurality of transversely spaced generally vertically oriented struts bridging said cross members and projecting upwardly therefrom, said struts being spaced laterally from said end walls and extending lengthwise in the direction of extension of said extractor, said main and reaction rollers being mounted on said struts for rotation about generally horizontal axes, said main rollers being positioned adjacent the outer extremities of said support portion and being so arranged on said struts that the upper extremity of each of said main rollers extends just slightly above the horizontal plane of the upper extremities of said cross members, the axis of rotation of each of said reaction rollers being disposed above the last mentioned plane.

6. A system in accordance with claim 1 wherein said means for driving said second member outwardly from said support portion a greater distance than said first member includes a lengthwise extending toothed rack fixed to said second member and a toothed rack secured to said support portion and extending in the direction of extension of the first mentioned rack, and gear means rotatably mounted on said first member and coacting with said racks for causing greater outward movement of said second member upon outward movement of said first member.

7. A system in accordance with claim 1 wherein said extractor comprises a plurality of transversely spaced extractor sections each of which includes said first and second members and said main and reaction rollers, said means for driving said first and second member outwardly from said support portion being operable to simultaneously drive the first and second members of each respective extractor section outwardly with respect to said support portion and in the same direction, for operation of said extractor sections as a unit.

8. In a warehousing system, a mobile load carrier including a generally horizontal portion adapted for supporting an extractor thereon, a load transferring extractor mounted on said support portion, said extractor comprising generally elongated relatively movable load supporting members disposed in nested relation giving lengthwise extensibility to said extractor whereby the latter may be extended generally laterally outwardly from said support portion, means carried by a first one of said members movably supporting a second one of said members thereon for generally lengthwise movement of said second member with respect to said first member, means for driving said first and second members in a lengthwise direction outwardly from said support portion and driving said second member a greater distance than said first member, means mounted on said support portion and movably supporting said members on said support portion, the last mentioned supporting means include transversely spaced outer main load bearing rollers mounted on said support portion and disposed generally beneath said members and engaging said first member on the underside thereof, and transversely spaced reaction means coacting between said first member and said support portion for supporting the first member in generally horizontal position in the extended condition of said first member, said reaction means including reaction rollers disposed inwardly in a lengthwise direction from said main rollers and being disposed at a higher level than the engagement of said main rollers with said first member, said reaction rollers being of a smaller size as compared to the size of said main rollers.

References Cited

UNITED STATES PATENTS

| | | |
|---|---|---|
| 1,937,189 | 11/1933 | Buettell et al. |
| 3,175,722 | 3/1965 | Paulssen. |
| 3,283,924 | 11/1966 | Chasar _____ 214—730 X |

GERALD M. FORLENZA, Primary Examiner

R. B. JOHNSON, Assistant Examiner

U.S. Cl. X.R.

214—16.4